United States Patent
Sharma et al.

(10) Patent No.: US 10,089,605 B2
(45) Date of Patent: Oct. 2, 2018

(54) METHODS AND SYSTEMS FOR TRANSMITTING PRIORITIZED MESSAGES TO EMPLOYEES

(71) Applicant: Conduent Business Services, LLC, Dallas, TX (US)

(72) Inventors: Avinash Sharma, Bangalore (IN); Abhishek Tripathi, Bangalore (IN); Koustuv Dasgupta, Bangalore (IN); Nischal Murthy Piratla, Fremont, CA (US); Raghav Goyal, Agra (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 421 days.

(21) Appl. No.: 14/736,649

(22) Filed: Jun. 11, 2015

(65) Prior Publication Data
US 2016/0364690 A1 Dec. 15, 2016

(51) Int. Cl.
*G06Q 10/10* (2012.01)
*H04L 12/58* (2006.01)

(52) U.S. Cl.
CPC .......... *G06Q 10/107* (2013.01); *H04L 51/04* (2013.01)

(58) Field of Classification Search
CPC .............. G06Q 30/02; G06Q 30/0251; G06Q 30/0254; G06Q 30/0255; G06Q 30/0257; G06Q 30/0261; G06Q 30/0264; G06Q 30/0269; G06Q 30/0277; H04L 67/306; H04L 67/22; H04L 67/18; G06F 17/30867; G06F 17/30528; G06F 17/3053;
(Continued)

(56) References Cited

U.S. PATENT DOCUMENTS

2003/0158777 A1* 8/2003 Schiff .................... G06Q 20/10
705/14.53
2010/0274636 A1* 10/2010 Sheridan ................ G06Q 10/10
705/7.32
(Continued)

OTHER PUBLICATIONS

Xiaoyuan Su; Taghi M. Khoshgoftaar. A survey of collaborative filtering techniques, Journal Advances in Artificial Intelligence archive, 2009 Article No. 4.
(Continued)

*Primary Examiner* — Edward Kim
(74) *Attorney, Agent, or Firm* — Jones Robb, PLLC

(57) ABSTRACT

Disclosed are methods and systems for transmitting a first electronic message to an employee. The method further includes generating a first data structure based on one or more first parameters of one or more electronic messages, one or more demographic attributes associated with the employee and one or more second parameters representative of one or more feedbacks provided by the employee on each of the one or more electronic messages other than the first electronic message. The method further includes determining a priority of the first electronic message, wherein the determination of the priority comprises predicting the one or more second parameters associated with the employee for the first electronic message based on the one or more second data structures. The method further includes transmitting the first electronic message to the employee based on the determined priority of the first electronic message.

20 Claims, 7 Drawing Sheets

(58) Field of Classification Search
CPC ....... H04W 4/206; H04W 4/02; H04W 4/021; H04W 4/023; H04W 4/028
USPC .......................................... 709/204, 206, 207
See application file for complete search history.

(56) References Cited

U.S. PATENT DOCUMENTS

| | | | | |
|---|---|---|---|---|
| 2012/0072997 | A1* | 3/2012 | Carlson ................. | G06Q 30/02 726/28 |
| 2012/0173639 | A1* | 7/2012 | Walsh .................... | G06Q 30/02 709/206 |
| 2012/0173640 | A1* | 7/2012 | Walsh .................... | G06Q 10/10 709/206 |
| 2012/0239479 | A1* | 9/2012 | Amaro ................. | G06Q 20/102 705/14.23 |
| 2014/0100922 | A1* | 4/2014 | Aycock ............. | G06Q 10/0639 705/7.38 |
| 2014/0115078 | A1* | 4/2014 | Bhatia ............... | G06F 17/30528 709/206 |
| 2014/0143341 | A1* | 5/2014 | Brady, Jr. ............. | G01C 21/20 709/204 |

OTHER PUBLICATIONS

Klami, Arto; Bouchard, Guillaume and Tripathi, Abhishek (2014). Group-sparse embeddings in collective matrix factorization. In International conference of Learning Representations 2014. http://arxiv.org/pdf/1312.5921.

Xiong et al. Temporal collaborative filtering with Bayesian probabilistic tensor factorization. In SIAM Data Mining , 2010.

Tamara G. Kolda and Brett W. Bader. Tensor Decompositions and Applications. SIAM Rev. 51, 3, 455-500, 2009.

\* cited by examiner

METHODS AND SYSTEMS FOR TRANSMITTING PRIORITIZED MESSAGES TO EMPLOYEES

TECHNICAL FIELD

The presently disclosed embodiments are related, in general, to an employee engagement environment. More particularly, the presently disclosed embodiments are related to methods and systems for transmitting prioritized messages to employees.

BACKGROUND

An organization may want to maintain a healthy relationship with one or more employees working in the organization. Usually, the human resource department of the organization may be involved in an engagement with the one or more employees so as to build the healthy relationship. Usually, the human resource department may transmit one or more personalized messages, in form of an electronic mail, a voice mail, or a text message, to the one or more employees that may be of interest. Usually such one or more messages may relate to a health domain, a wealth domain, or a career domain. The one or more employees may perform one or more actions on the one or more messages transmitted to him/her. Usually, the one or more actions may include viewing a message, assigning a rating to the message, and accepting/rejecting one or more offers proposed through the message. However, there may be a scenario when some of the one or more employees may not react or take any action on the one or more messages transmitted to him/her. In such a case, it may be required to encourage each of the one or more employees to at least take the one or more actions post receiving the one or more messages. This may be achieved by transmitting the one or more messages to the one or more employees based on at least a prioritization. Further, the prioritization of the one or more messages may be either an employee driven or an employer driven. A disadvantage of the employee driven prioritization may be that such prioritization may not necessarily align with an employer's vision of employee engagement. Also, a purely employer driven prioritization may utilize employer's defined factors to prioritize the one or more messages but at a cost of the employee's preference. Thus, in addition to the employee's preference for the prioritization of the one or more messages, it may also be important to include the employer's preferences for prioritizing the one or more messages. Therefore, there is a need for a robust method and system to prioritize the one or more messages considering the preferences of the employer as well as the one or more employees.

SUMMARY

According to the embodiments illustrated herein there is provided a method for transmitting a first electronic message to an employee. The method includes determining, by one or more processors, one or more first parameters of one or more electronic messages comprising the first electronic message. The method further includes determining, by the one or more processors, one or more demographic attributes associated with the employee and one or more second parameters representative of one or more feedbacks provided by the employee on each of the one or more electronic messages other than the first electronic message. The method further includes generating, by the one or more processors, a first data structure based on the one or more first parameters, the one or more second parameters, and the one or more demographic attributes. The method further includes determining, by the one or more processors, a priority of the first electronic message for the employee based on a part of one or more second data structures extracted from the first data structure. The determination of the priority comprises predicting, by the one or more processors, the one or more second parameters associated with the employee for the first electronic message based on the one or more second data structures. The method further includes transmitting, by the one or more processors, the first electronic message to the employee based on the determined priority of the first electronic message.

According to the embodiments illustrated herein there is provided a system for transmitting a first electronic message to an employee. The system comprises one or more processors configured to determine one or more first parameters of one or more electronic messages comprising the first electronic message. The one or more processors are further configured to determine one or more demographic attributes associated with the employee and one or more second parameters representative of one or more feedbacks provided by the employee on each of the one or more electronic messages other than the first electronic message. The one or more processors are further configured to generate a first data structure based on the one or more first parameters, the one or more second parameters, and the one or more demographic attributes. The one or more processors are further configured to determine a priority of the first electronic message for the employee based on a part of one or more second data structures extracted from the first data structure, wherein the determination of the priority comprises predicting the one or more second parameters associated with the employee for the first electronic message based on the one or more second data structures. The one or more processors are further configured to transmit the first electronic message to the employee based on the determined priority of the first electronic message.

According to embodiments illustrated herein there is provided a computer program product for use with a computing device. The computer program product comprising a non-transitory computer readable medium. The non-transitory computer readable medium stores a computer program code for transmitting a first electronic message to an employee. The computer program code is executable by one or more processors in the computing device to determine one or more first parameters of one or more electronic messages comprising the first electronic message. The computer program code is further executable by the one or more processors to determine one or more demographic attributes associated with the employee and one or more second parameters representative of one or more feedbacks provided by the employee on each of the one or more electronic messages other than the first electronic message. The computer program code is further executable by the one or more processors to generate a first data structure based on the one or more first parameters, the one or more second parameters, and the one or more demographic attributes. The computer program code is further executable by the one or more processors to determine a priority of the first electronic message for the employee based on a part of one or more second data structures extracted from the first data structure, wherein the determination of the priority comprises predicting the one or more second parameters associated with the employee for the first electronic message based on the one or more second data structures. The computer program code is further executable by the one or more processors to transmit the first electronic message to the employee based on the determined priority of the first electronic message.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not limit, the scope in any manner, wherein similar designations denote similar elements, and in which.

DETAILED DESCRIPTION

Figure 1:
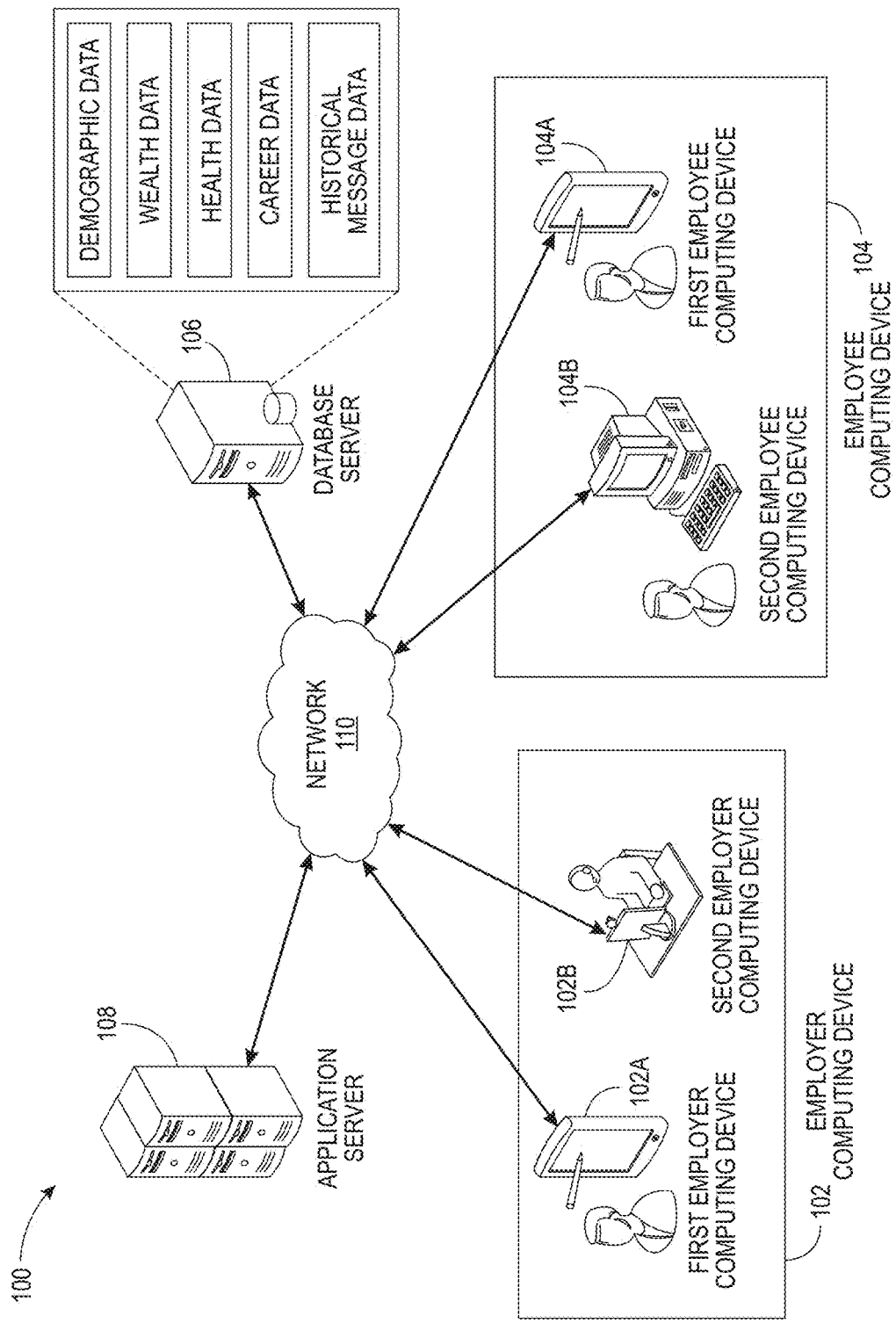
FIG. 1 illustrates a system environment diagram, in which various embodiments may be implemented.

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "at least one embodiment," "an embodiment," "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a smartphone, a tablet computer (e.g., iPad®, and Samsung Galaxy Tab®), and the like.

An "electronic message" refers to information communicated or transmitted to an individual over an electronic medium. The electronic medium may comprise equipment (e.g., a desktop computer, a laptop, a tablet, a mobile device, a television, a radio, or any other handheld devices) that may be utilized in the electronic communication. In an embodiment, the electronic message may belong to one or more domains such as a health domain, a wealth domain, a career domain, or any other domain. In an organization environment, the individual may correspond to an employee of the organization. Further, the electronic message may be generated by an employer or a subject-matter expert in the organization. In another embodiment, the electronic message may be generated by a third party, for example, other organizations or individuals, that may be transmitted to the employer/organization, which may further transmit it to one or more employees of the organization. In an embodiment, the electronic message may correspond to at least one or more of an instant message conversation, an electronic mail, a voice mail, a text message, and a message corresponding to a query/problem.

A "task" refers to a piece of work, an activity, an action, a job, a service, an instruction or an assignment to be performed. The task may necessitate the involvement of one or more employees. Examples of the task include, but are not limited to, generating a report, evaluating a document, conducting a survey, writing a code, extraction of data, translating a text, and the like.

An "employee" refers to an individual who may have been hired by an organization, a company, or another individual to perform a task. In an embodiment, the employee may perform the task in exchange for a compensation.

An "employer" refers to an organizational entity comprising one or more individuals engaged in a business of selling products/services to one or more other organizations or other individuals. Further, the one or more individuals may work together to achieve a predetermined goal. In an embodiment, an organization may include one or more teams that may further include one or more sets of employees. Each of the one or more teams may have respective goals. Hereinafter, "employer" and "organization" may be interchangeably used.

A "client" refers to an individual or a third party who may pay to other individual or organization/company in exchange for goods or services.

"One or more first parameters" refer to one or more predefined preferences/features of an employer towards one or more electronic messages. In an embodiment, the one or more first parameters may comprise one or more factors such as a risk, an initiative, and a campaign. Each of these factors may be represented by one or more numerical values. The one or more numerical values may be indicative of an importance of an electronic message as compare to another electronic message. Further, the one or more first parameters may comprise one or more domains of the one or more electronic messages such as a health domain, a wealth domain, and a career domain.

"Risk" refers to an importance of one or more electronic messages on a relative scale as defined by an employer or a subject matter expert.

"Campaign" refers to an importance of one or more electronic messages on a relative scale defined for a short term by a client, an employer or a subject matter expert. It may be utilized for highlighting the importance of the one or more electronic messages during a time of a year when there may be a push globally or by a community/society to increase an awareness of theme/subject that the one or more electronic messages may belong to.

"Initiative" refers to an importance of one or more electronic messages on a relative scale defined for a long term by a client based on the client's strategy for his/her employees' welfare in terms of at least a health, a wealth, or a career domain. In another embodiment, the initiative parameter may be defined by an employer or a subject matter expert.

"One or more demographic attributes" refer to a set of metadata in terms of at least one or more of a health, a wealth, a career, and a personal information associated with an employee. The personal information may comprise one or more of, but not limited to, a gender, an age group, a relationship code, a department code, an employee status, and a base salary.

"One or more second parameters" refer to one or more feedbacks provided by an employee on each of one or more electronic messages previously viewed by the employee. The one or more feedbacks provided by the employee on each of the one or more electronic messages may comprise at least a rating assigned, an action taken, or a text input corresponding to each of the one or more electronic messages. In an embodiment, the one or more second parameters may be represented by one or more numerical values. The one or more numerical values may indicative of one or more ratings provided by the employee on each of the one or more electronic messages that were transmitted to the employee in past.

A "data structure" refers to a collection of data stored in a memory. In an embodiment, various operations may be performed to manipulate the data structures. Some examples of data structures may include, but are not limited to, a matrix, an array, a record, a hash table, a union, graphs, and linked list.

An "index in a matrix" represents a row attribute and a column attribute. For example, an index (i, j) comprise value that represents $i^{th}$ and $j^{th}$ attribute.

A "priority" refers to a fact or condition of being treated or regarded as more important than others. In an embodiment, the priority may comprise one or more ratings such as, but not limited to, "high", "medium", "low," or "spam". In another embodiment, the priority may comprise one or more numerical values representing the one or more ratings such as, but not limited to, "1", "2", "3", or "4", wherein rating "1" may be assigned corresponding to a most important message and rating "4" may be assigned corresponding to a least important message, or vice versa.

"Classifier" refers to a mathematical model that may be configured to perform one or more operations such as classifying one or more electronic messages into one or more categories. For example, a classifier may assign priority to one or more electronic messages. In an embodiment, the classifier is trained based on historical data using one or more machine learning techniques such as, but not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

FIG. 1 is a block diagram of a system environment 100, in which various embodiments can be implemented. The system environment 100 includes an employer computing device 102 such as a first employer computing device 102A and a second employer computing device 102B, an employee computing device 104 such as a first employee computing device 104A and a second employee computing device 104B, a database server 106, an application server 108, and a network 110. Various devices in the system environment 100 may be interconnected over the network 110. FIG. 1 shows, for simplicity, two employer computing devices 102A and 102B, two employee computing devices 104A and 104B, one database server 106, and one application server 108. However, it will be apparent to a person having ordinary skill in the art that the disclosed embodiments may also be implemented using multiple employer computing devices 102, multiple employee computing devices 104, multiple database servers 106, and multiple application servers 108.

In an embodiment, the employer computing device 102 may correspond to a computing device that may be utilized by an employer. In an embodiment, the employer may correspond to an organizational entity comprising one or more individuals engaged in a business of selling products/services to one or more other organizations or other individuals. The employer computing device 102 may comprise one or more processors in communication with one or more memories. The employer computing device 102 may be operable to execute one or more sets of instructions stored in the one or more memories. In an embodiment, the employer computing device 102 may be communicatively coupled to the network 110. In an embodiment, the employer computing device 102 may comprise a display screen that may be configured to display one or more graphical user interfaces (GUIs) to the employer. In an embodiment, the employer may utilize the employer computing device 102 to transmit one or more first electronic messages to the employee computing device 104, the database server 106, and/or the application server 108 over the network 110. For example, an employer may transmit a first electronic message such as "Exclusive deals on IPhone". The one or more first electronic messages may correspond to messages from various domains (e.g., a health domain, a career domain, or a wealth domain) that may be required to be transmitted to one or more employees of an organization. Further, in an embodiment, the employer may utilize the employer computing device 102 to transmit one or more first parameters, corresponding to each of the one or more first electronic messages, to the database server 106 and/or the application server 108 over the network 110. In an embodiment, the one or more first parameters may be represented as numerical values. Therefore, the employer may utilize the employer computing device 102 to input the one or more numerical values corresponding to the one or more first parameters associated with the one or more first electronic messages.

In an embodiment, the employer computing device 102 may correspond to various types of computing devices such as, but not limited to, a desktop computer, a laptop, a personal digital assistant (PDA), a mobile device, a smartphone, a tablet computer (e.g., iPad® and Samsung Galaxy Tab®), and the like.

In an embodiment, the employee computing device 104 may correspond to a computing device used by the one or more employees. In an embodiment, the one or more employees may correspond to one or more individuals/persons/users, who may have been hired by the employer/organization to work upon one or more tasks. The employee computing device 104 may comprise one or more processors in communication with one or more memories. The employee computing device 104 may be operable to execute one or more sets of instructions stored in the one or more memories. In an embodiment, the employee computing device 104 may be communicatively coupled to the network 110. In an embodiment, the employee computing device 104 may comprise a display screen that may be configured to display one or more graphical user interfaces (GUIs) to the one or more employees. In an embodiment, the one or more employees may utilize the employee computing device 104 to receive/view the one or more first electronic messages transmitted from the employer computing device 102 or the application server 108 over the network 110. Thereafter, the one or more employees may utilize the employee computing device 104 to perform one or more actions on the received one or more first electronic messages. The one or more actions corresponding to an electronic message may comprise one or more of, but not limited to, viewing the electronic message, assigning a rating to the electronic message, providing a text input corresponding to the electronic message, and accepting/rejecting one or more offers proposed through the electronic message. For example, an employee may receive the first electronic message such as "Exclusive deals on IPhone". Thereafter, the employee may view the received first electronic message, may click on a link, if any, to view/purchase the IPhone, and further may assign a rating to the first electronic message.

In another embodiment, the one or more employees may utilize the employee computing device 104 to block any further reception of the one or more first electronic messages pertaining to the one or more domains. For example, an employee may block a reception of one or more first electronic messages from a wealth domain. In another embodiment, the one or more employees may not take any actions on the received one or more first electronic messages. For example, an employee may utilize the employee computing device 104 to view a received first electronic message but may not take any further actions on it.

In an embodiment, the employee computing device 104 may correspond to various types of computing devices such as, but not limited to, a desktop computer, a laptop, a personal digital assistant (PDA), a mobile device, a smartphone, a tablet computer (e.g., iPad® and Samsung Galaxy Tab®), and the like.

In an embodiment, the database server 106 may refer to a computing device or a storage system that may be configured to store one or more historical electronic messages, in accordance with at least one embodiment. The one or more historical electronic messages may correspond to one or more electronic messages that may have been transmitted to the one or more employees of the organization in the past. Further, in an embodiment, the database server 106 may store a log of the one or more actions performed by the one or more employees on each of the one or more historical electronic messages. The log of the one or more actions may comprise one or more of, but not limited to, an assigned rating, a text inputted, and other data depicting a viewing, an acceptance or a rejection of one or more proposed offers associated with each of the one or more historical electronic messages. In an embodiment, the database server 106 may store likes, dislikes, or preferences of the one or more employees in terms of at least one or more of, but not limited to, the health domain, the wealth domain, and the career domain. Further, the database server 106 may maintain a record of the likes, dislikes, or preferences of the one or more employees at one or more time instances. For example, an employee prefers health tips in December and January (i.e., winter season) while the employee prefers career tips in March and April. Further, in an embodiment, the database server 106 may store historical records of the one or more employees. The historical records may comprise one or more demographic attributes of the one or more employees. The one or more demographic attributes may comprise personal information such as a gender, an age group, a relationship code, a department code, an employee status, and a base salary. In an embodiment, the database server 106 may extract the log of the one or more actions and the one or more demographic attributes of each employee from various sources such as, but not limited to, file systems, work logs, cloud systems, or databases of one or more companies/organizations.

In an embodiment, the database server 106 may be communicatively coupled over the network 110. In an embodiment, the database server 106 may be configured to transmit or receive the one or more electronic messages, the one or more demographic attributes, the one or more first parameters to/from one or more computing devices, such as the employer computing device 102 and the application server 108 over the network 110. Further, in an embodiment, the database server 106 may store one or more instructions, codes, scripts, or programs that may be retrieved by the application server 108 to perform one or more operations related to the prioritization and the transmission of the one or more first electronic messages to the one or more employees. For querying the database server 106, one or more querying languages may be utilized such as, but not limited to, SQL, QUEL, DMX and so forth. Further, the database server 106 may be realized through various technologies such as, but not limited to, Microsoft® SQL server, Oracle, and My SQL.

The application server 108 may refer to a computing device or a software framework that may provide a generalized approach to create the application server implementation. In an embodiment, the function of the application server 108 may be dedicated to the efficient execution of procedures, such as, but not limited to, programs, routines, or scripts stored in one or more memories for supporting its applied applications. In an embodiment, the application server 108 may receive or extract the one or more electronic messages from the employer computing device 102 or the database server 106. The one or more electronic messages may comprise the one or more first electronic messages (i.e., the one or more new electronic messages) and the one or more historical electronic messages. Thereafter, the application server 108 may be configured to determine the one or more first parameters associated with the one or more electronic messages. The one or more first parameters may be represented by the one or more numerical values.

Further, in an embodiment, the application server 108 may extract the historical records of the one or more employees from the database server 106. Thereafter, the application server 108 may be configured to extract the one or more demographical attributes of each of the one or more employees from the historical records of each of the one or more employees.

Further, in an embodiment, the application server 108 may extract the log of the one or more actions performed by the one or more employees on each of the one or more historical electronic messages from the database server 106 over the network 110. Thereafter, the application server 108 may be configured to determine one or more second parameters associated with the one or more historical electronic messages. The one or more second parameters may be representative of one or more feedbacks provided by the one or more employees on the one or more historical electronic messages. In an embodiment, the application server 108 may determine the one or more second parameters based on the extracted log of the one or more actions. In another embodiment, the application server 108 may extract the one or more second parameters from the database server 106. The one or more first parameters may be represented by one or more numerical values.

Thereafter, the application server 108 may prioritize the one or more first electronic messages based on the one or more first parameters, the one or more second parameters, the one or more demographic attributes. The prioritization of the one or more first electronic messages has been explained later in conjunction with FIG. 3. After the prioritization of the one or more first electronic messages, the application server 108 may transmit the one or more first electronic messages, based on the respective prioritization, to the one or more employees.

In an embodiment, the application server 108 may be realized through various web-based technologies such as, but not limited to, a Java web-framework, a .NET framework, a PHP framework, or any other web-application framework. The application server 108 has been described later in conjunction with FIG. 2.

A person having ordinary skill in the art will understand that the scope of the disclosure is not limited to the employer computing device 102, the database server 106 or the application server 108 as a separate entity. In an embodiment, the functionalities of the database server 106 may be integrated into the employer computing device 102 and/or the application server 108.

The network 110 corresponds to a medium through which the one or more electronic messages, the one or more first parameters, the one or more demographic attributes, and the one or more second parameters representative of the one or more feedbacks flow between various devices of the system environment 100 (e.g., the employer computing device 102, the employee computing device 104, the database server 106, and the application server 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
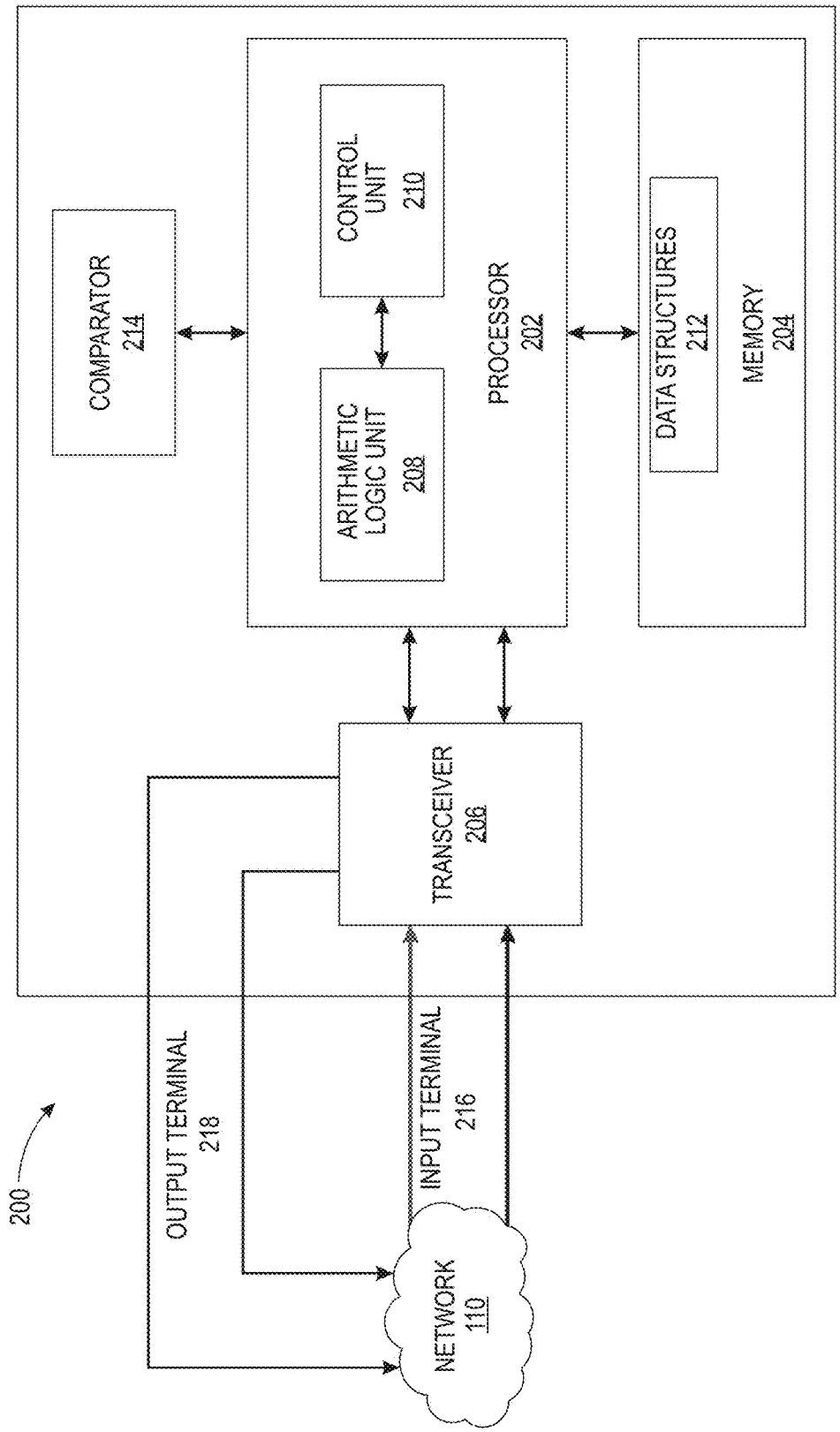
FIG. 2 is a block diagram that illustrates a system for transmitting a prioritized first electronic message to one or more employees, in accordance with at least one embodiment.

FIG. 2 is a block diagram illustrating a system 200 for transmitting the prioritized one or more first electronic messages to the one or more employees, in accordance with at least one embodiment. The system 200 may comprise one or more processors, such as a processor 202, one or more memories, such as a memory 204, one or more transceivers, such as a transceiver 206, one or more arithmetic logic units such as an arithmetic logic unit (ALU) 208, one or more control units, such a control unit 210, and one or more comparators, such as a comparator 214. The transceiver 206 is coupled with an input terminal 216 and an output terminal 218.

The system 200 may correspond to the employer computing device 102 or the application server 108 without departing from the scope of the disclosure. For the purpose of the ongoing description, the system 200 has been considered as the application server 108.

The processor 202 may be configured to execute a set of instructions, codes, scripts, or programs stored in the memory 204 to perform the one or more operations. The processor 202 may be coupled to the memory 204, the transceiver 206, and the comparator 214. The processor 202 may comprise the ALU 208 and the control unit 210. The ALU 208 may be coupled to the control unit 210. The ALU 208 may be operable to perform one or more mathematical and logical operations and the control unit 210 may control the operation of the ALU 208. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store at least one or more sets of instructions, codes, algorithms, programs, or scripts. The memory 204 may further store the one or more first parameters, the one or more demographic attributes, and the one or more second parameters representative of the one or more feedback provided by the one or more employees on each of the one or more electronic messages other than the one or more first electronic messages. Further, the memory 204 may include data structures 212. The data structures 212 comprise one or more data structures such as the first data structure, the second data structure, the third data structure, the fourth data structure, the fifth data structure, the sixth data structure, and the seventh data structure. Some of the commonly known memory implementations include, but are not limited to, a random access memory (RAM), a read-only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 enables the hardware of the system 200 to perform the predetermined operation.

The transceiver 206 may be operable to communicate with the one or more devices, such as the employer computing device 102 or the employee computing device 104 and/or one or more servers, such as the database server 106 over the network 110. The transceiver 206 may be operable to transmit or receive the instructions/queries, the one or more first electronic messages, the one or more first parameters, the one or more demographic attributes, or the one or more second parameters representative of the one or more feedbacks to/from various components of the system environment 100. In an embodiment, the transceiver 206 is coupled to the input terminal 216 and the output terminal 218 through which the transceiver 206 may receive or transmit the instructions/queries, the one or more first electronic messages, the one or more first parameters, the one or more demographic attributes, or the one or more second parameters representative of the one or more feedbacks. In an embodiment, the input terminal 216 and the output terminal 218 may be realized through, but not limited to, an antenna, an Ethernet port, an USB port or any other port that can be configured to receive and transmit data. The transceiver 206 may receive and transmit various data in accordance with various communication protocols such as, TCP/IP, UDP, and 2G, 3G, or 4G communication protocols through the input terminal 216 and the output terminal 218, respectively.

The comparator 214 is configured to compare at least two input signals to generate an output signal. In an embodiment, the output signal may correspond to either '1' or '0'. In an embodiment, the comparator 214 may generate output '1' if the value of a first signal (from the at least two signals) is greater than a value of the second signal (from the at least two signals). Similarly, the comparator 214 may generate an output '0' if the value of the first signal is less than the value of the second signal. In an embodiment, the comparator 214 may be realized through either software technologies or hardware technologies known in the art. Though, the comparator 214 is depicted as independent from the processor 202 in FIG. 2, a person skilled in the art will appreciate that the comparator 214 may be implemented within the processor 202 without departing from the scope of the disclosure.

Figure 3:
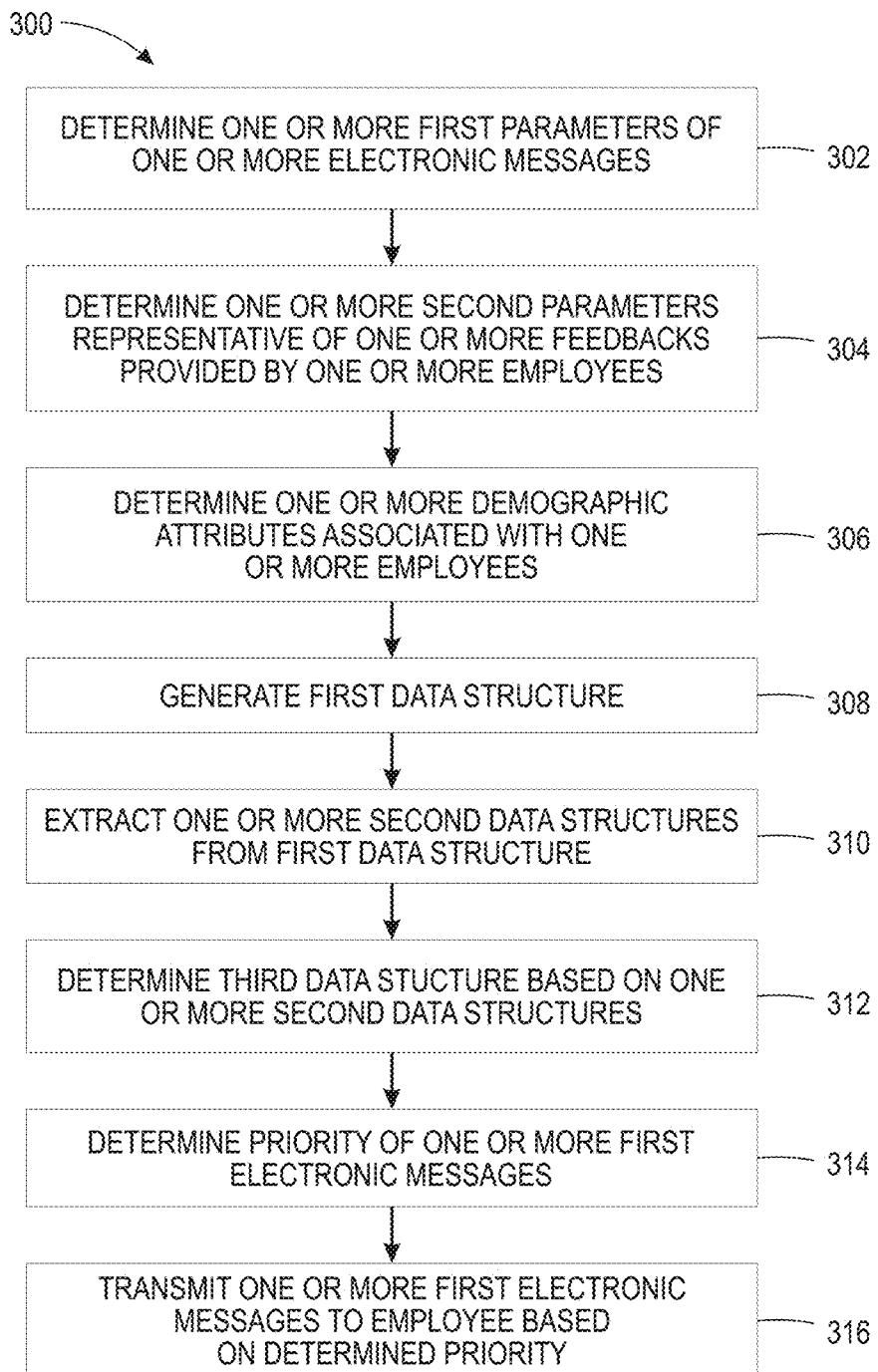
FIG. 3 is a flowchart illustrating a method for transmitting a prioritized first electronic message to one or more employees, in accordance with at least one embodiment.

FIG. 3 is a flowchart 300 illustrating the method for transmitting a prioritized first electronic message to the one or more employees, in accordance with at least one embodiment. The flowchart 300 is described in conjunction with FIG. 1 and FIG. 2.

At step 302, the one or more first parameters of the one or more electronic messages are determined. In an embodiment, the processor 202 may be configured to determine the one or more first parameters of the one or more electronic messages. Prior to determining the one or more first parameters, the processor 202 may receive/extract the one or more electronic messages. The one or more electronic messages may comprise the one or more first electronic messages (i.e., the one or more new electronic messages) and the one or more historical electronic messages. Further, the one or more electronic messages may correspond to at least one or more of, but not limited to, an instant message conversation, an electronic mail, a voice mail, a text message, and a message corresponding to a query/problem. In an embodiment, the processor 202 may receive or extract the one or more first electronic messages from the employer computing device 102 or the database server 106. Further, the processor 202 may extract the one or more historical electronic messages from the database server 106.

Post extracting the one or more electronic messages, the processor 202 may determine the one or more first parameters associated with the one or more electronic messages. The one or more first parameters may correspond to the one or more features/factors depicting employer's preferences/interests/ratings towards the one or more electronic messages. The one or more first parameters may comprise one or more factors such as the risk, the initiative, and the campaign associated with the one or more electronic messages. In an embodiment, the one or more first parameters may be represented by the one or more numerical values. The processor 202 may determine the one or more first parameters for the one or more first electronic messages based on at least one or more predefined instructions. For example, a predefined instruction may comprise "assign a risk score of 60 to a second message corresponding to an offer on purchase of Samsung products". In an embodiment, a data type of the one or more numerical values may correspond to at least one or more of, but not limited to, a numerical data type and a binary data type. The one or more numerical values may be representative of importance of the one or more electronic messages from perspective of the employer or the subject matter expert.

In another embodiment, the employer or the subject matter expert, who are involved in development, processing, or transmitting of the one or more electronic messages, may assign/provide the one or more numerical values to the one or more electronic messages. For example, an employer may assign a risk score of 70 to a first electronic message. This may imply that the first electronic message is important with a risk of 70. The risk score may relate to the importance of the first electronic message. In an embodiment, a higher risk score associated with an electronic message may depict a higher importance of the electronic message. Similarly, the employer may assign an initiative score of 50 to the first electronic message and an initiative score of 70 to a second electronic message. This may implies that the employer's preference for the second electronic message is more than the first electronic message. In such a scenario, the processor 202 may receive or obtain the one or more first parameters associated with the one or more first electronic messages from the employer computing device 102 or the database server 106. In an embodiment, the processor 202 may obtain the one or more first parameters associated with the one or more historical electronic messages from the database server 106.

Further, in an embodiment, the processor 202 may generate a fourth data structure based on at least the one or numerical values associated with the one or more first parameters. The fourth data structure may correspond to a matrix comprising one or more rows and one or more columns. The one or more rows may represent the one or more first parameters of the one or more electronic messages and the one or more columns may represent the one or more electronic messages or vice versa. The processor 202 may populate the fourth data structure based on the numerical values associated with the one or more electronic messages. In an embodiment, the processor 202 may assign a binary value "1" in an index of the fourth data structure if an electronic message represented by the index satisfies a first parameter represented by the index under consideration.

For example, consider a first electronic message "50 percent discount on complete medical check-up at Fortis" and the campaign score as 80. In such a case, the processor 202 may assign "1" in an index representing the health domain and the first electronic message. Further, the processor 202 may assign "1" in an index representing the campaign parameter and the first electronic message. Thereafter, the processor 202 may assign "0" in remaining indexes pertaining to the first electronic message. Similarly, the processor 202 may assign either "1" or "0" to each of one or more indexes to obtain the fourth data structure as shown below as an illustrative example:

$$X_M = \begin{array}{c} \\ C \\ I \\ H \\ W \end{array} \begin{array}{|cccc|} HM1 & HM2 & HM3 & FM1 \\ \hline 0 & 1 & 1 & 0 \\ 1 & 0 & 1 & 1 \\ 1 & 0 & 1 & 1 \\ 0 & 1 & 0 & 0 \end{array}$$

wherein,

X$_M$: Fourth data structure;
C: Campaign parameter;
I: Initiative parameter;
H: Health domain;
W: Wealth domain;
HM1, HM2, HM3: Historical electronic messages transmitted in the past; and
FM1: New electronic messages to be transmitted.

At step 304, the one or more second parameters are determined. In an embodiment, the processor 202 may be configured to determine the one or more second parameters. In an embodiment, the one or more second parameters may be representative of the one or more feedbacks provided by the one or more employees on the one or more historical electronic messages. The one or more feedbacks may comprise at least a rating assigned, an action taken, or a text inputted corresponding to the one or more historical electronic messages. The one or more second parameters may be represented by the one or more numerical values. The one or more numerical values may be indicative of a rating associated with the one or more historical electronic messages. The rating may vary between numerical values 1 and 5. In an embodiment, the processor 202 may determine the one or more second parameters by utilizing the log of the one or more actions performed by the one or more employees on the one or more historical electronic messages. The log of the one or more actions may comprise one or more of, but not limited to, the assigned rating, the text inputted, and the likes/dislikes pertaining to each of the one or more historical electronic messages. For example, an employee has assigned previously a rating of 2 to a first historical message from a health domain. However, the employee has not provided any rating to a second historical message which is similar to the first historical message but has liked the second historical message. In such a case, the processor 202 may assign a rating of 2 to the second historical message similar to that of the first historical message considering the preferences of the employee has not changed over time. In case, the employee has not responded to the one or more historical electronic messages, the processor 202 may not assign/determine the one or more numerical values pertaining to the one or more historical electronic messages. Further, in an embodiment, the processor 202 may utilize the one or more numerical values pertaining to the one or more second parameters to generate a fifth data structure. In an embodiment, the fifth data structure may correspond to a matrix, wherein one or more rows correspond to the one or more employees and one or more columns correspond to the one or more one or more electronic messages or vice versa. The processor 202 may populate the fifth data structure and thereafter may assign/insert the one or more numerical values in each of one or more indexes of the empty fifth data structure. A person having ordinary skill in the art will understand that the fifth data structure may comprise one or more empty indexes corresponding to the one or more electronic messages. This may be because the one or more second parameters corresponding to the one or more electronic messages may not be available. For example:

|  |  | HM1 | HM2 | HM3 | FM1 |
|---|---|---|---|---|---|
|  | EM1 | 1 | ? | 3 | ? |
| X$_E$ = | EM2 | 2 | 4 | 1 | ? |
|  | EM3 | 1 | ? | 5 | ? |
|  | EM4 | ? | 1 | 3 | ? | wherein,

X$_E$: Fifth data structure;
EM1, EM2, EM3, EM4: Employees of the organization; and
?: Missing values.

At step 306, the one or more demographic attributes associated with the one or more employees are determined. In an embodiment, the processor 202 may be configured to extract the one or more demographic attributes from the database server 106 or the memory 204. The one or more demographic attributes may comprise the personal information of the one or more employees such as, but not limited to, a gender, an age group, a relationship code, a department code, an employee status, and a base salary. Further, in an embodiment, the processor 202 may generate a seventh data structure based on at least the one or more demographic attributes. The seventh data structure may correspond to a matrix comprising one or more rows and one or more columns. The one or more rows may correspond to the one or more employees and the one or more columns may correspond to the one or more demographic attributes or vice versa. The processor 202 may populate the seventh data structure and thereafter may assign/insert the one or more numerical values in each of one or more indexes of the seventh data structure. In an embodiment, the one or more numerical values may correspond to a binary data type or a numeric data type. For instance, the processor 202 may assign a binary value "1" in an index of the seventh data structure if an employee represented by the index satisfies a demographic attributes represented by the index under consideration. For example, a first male employee belongs to an age group of 25-30. In such a case, the processor 202 may assign "1" in an index corresponding to the age group 25-30 and the first male employee. Further, the processor 202 may assign "1" in other index corresponding to a male gender group and the first male employee under consideration. Thereafter, the processor 202 may assign "0" in remaining indexes pertaining to the first male employee. Similarly, the processor 202 may assign either "1" or "0" to each of the one or more indexes to obtain the seventh data structure as shown below with an illustrative example:

|  |  | A (25-30) | M | F | BS ($1000) |
|---|---|---|---|---|---|
|  | EM1 | 1 | 1 | 0 | 0 |
| X$_D$ = | EM2 | 0 | 0 | 1 | 1 |
|  | EM3 | 1 | 0 | 1 | 1 |
|  | EM4 | 1 | 1 | 0 | 1 | wherein,

X$_D$: Seventh data structure;
A (25-30): Employees in age group of 25-30 years;
M: Male employee;
F: Female employee: and
BS ($1000): Employees with base salary $1000.

At step 308, a first data structure is generated. In an embodiment, the processor 202 may be configured to generate the first data structure based on at least the one or more of, but not limited to, the one or more first parameters, the one or more second parameters, and the one or more demographic attributes. In an embodiment, the first data structure may correspond to a matrix. In an embodiment, the processor 202 may utilize a transformation technique such as a Collective Matrix Factorization (CMF) technique on the fourth data structure, the fifth data structure, and/or the seventh data structure to generate the first data structure. The CMF technique may correspond to a technique that may be utilized to simultaneously factorize/transform one or more of, but not limited to, the one or more first parameters, the one or more second parameters, and the one or more demographic attributes such that shared information of the employer and the one or more employees may be captured in the low-rank representations of the first data structure. A person having ordinary skill in the art would appreciate that the scope of the disclosure is not limited to obtaining the first data structure using CMF technique. In an embodiment, processor 202 may utilize other one or more transformation techniques such as, but not limited to, a Principal Component Analysis (PCA) technique, a Non-negative Matrix Factorization (NMF) technique, a Collaborative Filtering (CA) technique, a Canonical Correlation Analysis technique (CCA), or an Inter-Battery Factor Analysis (IBFA) technique. In an embodiment, the processor 202 may store the transformation of the one or more first parameters, the one or more second parameters, and the one or more demographic attributes as the first data structure in the data structures 212 of the memory 204. Following mathematical representation illustrates creation of the first data structure from the first data structure, the second data structure, and/or the third data structure:

$$
\begin{array}{c}
\phantom{F}\ M\ \ \ \ D\ \ \ \ M \\
F\ \Box\ E\ \Box\ E\ \Box \\
\phantom{F\ }X_M\ \ X_D\ \ X_E
\end{array}
\longrightarrow
\begin{array}{c|c|c|c|c|}
 & E & M & D & F \\\hline
E & ? & X_E & X_D & ? \\\hline
M & X_E^T & ? & ? & X_M^T \\\hline
D & X_D^T & ? & ? & ? \\\hline
F & ? & X_M & ? & ? \\\hline
\end{array} = [Y] \quad (1)
$$

wherein,
$X_E^T$: Transpose of the matrix $X_E$;
$X_D^T$: Transpose of the matrix $X_D$;
$X_M^T$: Transpose of the matrix $X_M$;
M: One or more electronic messages;
F: One or more first parameters of the one or more electronic messages;
D: One or more demographic attributes of the one or more employees:
?: Missing/blank values (may be padded with zeroes); and
Y: Collective matrix (i.e. the first data structure).

As illustrated in equation 1, the matrices represented by $X_M$, $X_D$, and $X_E$ are combined into the collective matrix Y. The collective matrix Y may correspond to the first data structure which is a square matrix of the dimensions (E+M+D+F)*(E+M+D+F).

At step 310, the one or more second data structures are extracted from the first data structure. In an embodiment, the processor 202 may be configured to extract the one or more second data structures from the first data structure. The one or more second data structures may correspond to one or more low-rank matrices, which may capture the similar preferences of the employer and the one or more employees. In an embodiment, the collective matrix Y is factorized into the one or more second data structures (i.e., the low-rank matrices such as U and $U^T$). In an embodiment, the processor 202 may utilize a Bayesian learning technique to perform the decomposition/factorization such that the matrix U is of 'K' dimensions. In an embodiment, the dimension 'K' of the matrix U may be a controllable parameter that may be adjusted empirically using cross-validation. In an embodiment, a user of the employer computing device 102 or the application server 108 may adjust the value of the K. When the collective matrix Y is transformed (i.e., converted into the lower rank matrices U), the processor 202 may store the transformed matrices as the one or more second data structures in the data structures 212 of the memory 204. For example, a second data structure (U) may be represented as shown below:

$$
U^T = \begin{array}{|c|c|c|c|} \hline U_E^T & U_M^T & U_D^T & U_F^T \\ \hline \end{array} \Big\} 1,\ldots,K
$$

$$
U = \begin{array}{|c|} \hline U_E \\ \hline U_M \\ \hline U_D \\ \hline U_F \\ \hline \end{array} \Big\} 1,\ldots,K
$$

At step 312, the third data structure is determined based on the one or more second data structures. In an embodiment, the processor 202 may utilize the one or more second data structures to determine/generate the third data structure. The third data structure may correspond to the joint prioritization matrix. In an embodiment, the processor 202 may utilize one or more parts of the one or more second data structures to generate the third data structure. The processor 202 may extract the one or more parts from the one or more second data structures. For example, one or more parts of one or more second data structures comprise at least $U_E$, $U_M$, $U_D$, and $U_F$. The processor 202 may utilize at least a plurality of the one or more parts to generate the third data structure. In an embodiment, the processor 202 may utilize the following equation to determine the third data structure:

$$P = U_E * U_M^T \quad (2)$$

wherein,
P: Third data structure (i.e. Joint prioritization matrix);
$U_E$: Lower dimensional representation of matrix $X_E$;
$U_M$: Lower dimensional representation of matrix $X_M$; and
$U_M^T$: Transpose of $U_M$.

At step 314, the priority of the one or more first electronic messages is determined. In an embodiment, the processor 202 may determine the priority of the one or more first electronic messages based on at least the comparison of the fifth data structure with the third data structure (i.e., the joint prioritization matrix). In an embodiment, the comparator 214 may be configured to compare the third data structure with the fifth data structure. The processor 202 may determine the numerical values pertaining to the one or more empty indexes (i.e., one or more missing values) in the fifth data structure based on at least the comparison. Thereafter, the numerical values may be utilized to obtain an updated fifth data structure. For example, consider a fifth data structure and a third data structure as shown below:

$$
X_E = \begin{array}{c} \phantom{EM1} \\ EM1 \\ EM2 \end{array}
\begin{array}{|c|c|c|} \hline HM1 & FM1 & FM2 \\ \hline A1 & ? & ? \\ \hline B1 & ? & ? \\ \hline \end{array}
\quad P = \begin{array}{|c|c|c|} \hline A2 & C2 & C3 \\ \hline B2 & D2 & D3 \\ \hline \end{array}
$$

wherein,
$X_E$: Fifth data structure;
HM1: Historical electronic message;

EM1, EM2: Employees;
FM1, FM2: New electronic messages; and
P: Joint prioritization matrix (i.e., third data structure), wherein 02>C3 and D2<D3.

The processor 202 compares the matrix $X_E$ with the joint prioritization matrix P to obtain the updated fifth data structure as shown below:

$$UX_E = \begin{array}{c} \\ EM1 \\ EM2 \end{array} \begin{array}{|c|c|c|} \hline HM1 & FM1 & FM2 \\ \hline A1 & C2 & C3 \\ \hline B1 & D2 & D3 \\ \hline \end{array}$$

wherein,
$UX_E$: Updated fifth data structure.

Post determining the updated fifth data structure, the processor 202 may utilize the determined numerical values (e.g., C2, C3, D2, and D3) pertaining to the one or more first electronic messages (e.g., FM1 and FM2) in the updated fifth data structure to determine the priority of the one or more first electronic messages for the one or more employees (e.g., EM1 and EM2). In an embodiment, a higher numerical value corresponding to a first electronic message may represent a higher priority or vice versa. Similarly, a lower numerical value corresponding to the first electronic message may represent a lower priority or vice versa. For example, considering the updated fifth data structure, the processor 202 determines that C2 is greater than C3. Therefore, the processor 202 may assign a higher priority to a new electronic message FM1 as compared to other new electronic message FM2 for the employee EM1. Similarly, the processor 202 determines that D2 is less than D3. Therefore, the processor 202 may assign a lower priority to the new electronic message FM1 as compared to the other new electronic message FM2 for the employee EM2.

At step 316, the one or more first electronic messages are transmitted to the one or more employees based on at least the determined priority. In an embodiment, the processor 202 may transmit the one or more first electronic messages to the one or more employees based on at least the determined priority of the one or more first electronic messages as discussed above in step 314. Considering the illustrative example as discussed above in step 314, the processor 202 may transmit the new electronic message FM1 under a high priority category and the other new electronic message FM2 under either a medium or low priority category to the employee EM1.

An illustrative example about an effect of prioritization of one or more first electronic messages is as follows: a personalized messaging system may analyse profile of one or more employees in an organization. Thereafter, the personalized messaging system may transmit one or more first electronic messages to each one of the one or more employees which may be relevant to them based on their profile. The personalized messaging system may further rank the one or more first electronic messages based on several factors such as rank given by a subject matter expert (risk), client's HR strategy (campaign and initiative). Each employee may get to see only the most important one or more first electronic messages as per the rank given by the personalized messaging system. Considering an example of Chloe Sanchez who has just joined the organization. She is single and her age is 23. The personalized messaging system looks at her 401 K data and observes that she is not contributing to her 401 K. The subject matter expert has configured a message for the profile such as Chloe Sanchez which motivates her to start saving money early for securing her future. She gets the message—"Don't leave money on the table, start contributing to your 401 k". Chloe Sanchez is not interested in starting her 401 K contribution and gives a feedback that the message is not relevant for her. The personalized messaging system captures her feedback and in comparison to other message that the personalized messaging system had sent her, it de-prioritizes the message (lowers the rank) so that it is not the most important message that Chloe Sanchez is expected to see.

Figure 4:
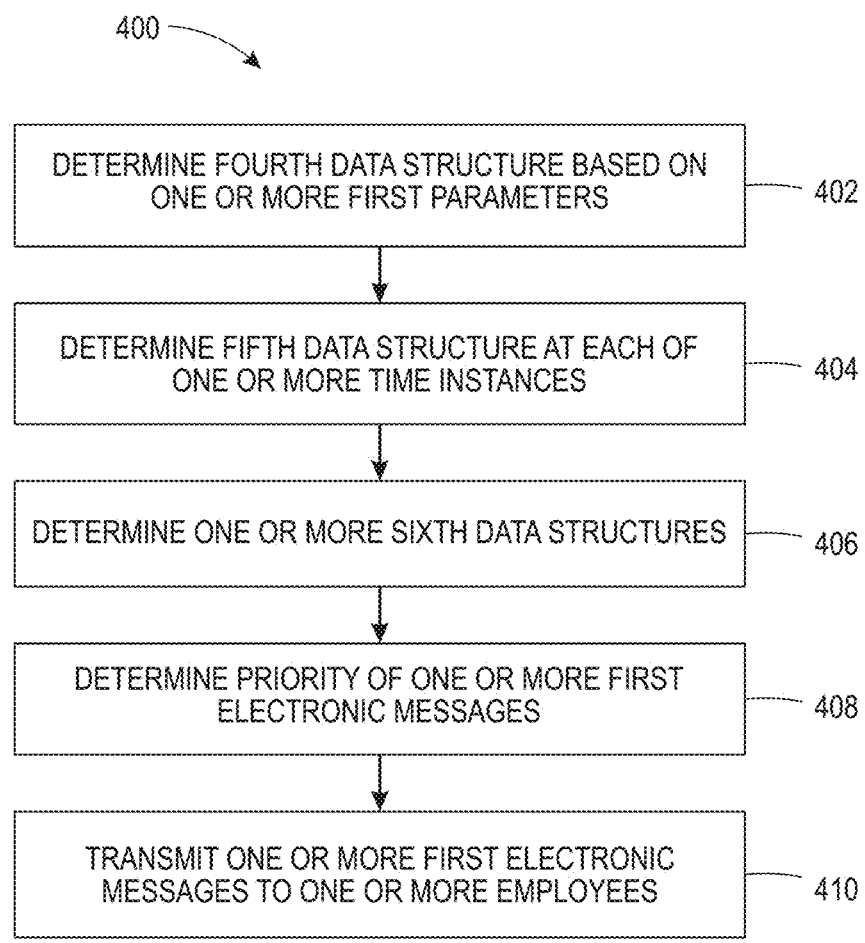
FIG. 4 is a flowchart illustrating a method for transmitting a first electronic message to one or more employees, when preferences of the one or more employees changes with time, in accordance with at least one embodiment.

Further, usually the preferences/interests of the one or more employees may change over time. For example, an employee may prefer health tips in December and January (i.e., winter season) and may prefer career tips in March and April. Therefore, it may be necessary to utilize the changing preferences of the one or more employees at the one or more time instances so as to achieve higher accuracy in prioritizing the one or more first electronic messages before transmitting them to the one or more employees. FIG. 4 is a flowchart 400 illustrating a method for transmitting a prioritized first electronic message to the one or more employees, when preferences/interests of the one or more employees changes with time, in accordance with at least one embodiment. The flowchart 400 is described in conjunction with FIG. 1, FIG. 2, and FIG. 3.

At step 402, the fourth data structure is determined based on the one or more first parameters. In an embodiment, the processor 202 may determine the fourth data structure based on the one or more first parameters provided by the employer for each of the one or more electronic messages. In an embodiment, the processor 202 may determine the fourth data structure in the same manner as discussed above in step 302.

At step 404, the fifth data structure is determined at each of the one or more time instances. The fifth data structure may comprise the one or more numerical values pertaining to the one or more historical electronic messages. In an embodiment, the processor 202 may determine the fifth data structure at each of the one or more time instances in the same manner as discussed above in step 304. The fifth data structure may further comprise the one or more missing values pertaining to the one or more historical electronic messages for which the one or more second parameters may not be available. Thereafter, the processor 202 may determine the one or more missing values in the fifth data structure for each time instance in the same manner as discussed above in step 314, to generate one or more updated fifth data structures. The one or more missing values may correspond to predicted one or more first parameters of the one or more employees for the one or more historical electronic messages.

At step 406, one or more sixth data structures are determined based on at least the fourth data structure and the one or more updated fifth data structures at each of the one or more time instances. In an embodiment, the processor 202 may be configured to determine/generate the one or more sixth data structures based on at least the fourth data structure and the one or more updated fifth data structures. In an embodiment, the processor 202 may utilize a transformation technique such as a Canonical Tensor Decomposition (CTD) technique on at least the fourth data structure and/or the one or more updated fifth data structures to determine/generate the one or more sixth data structures. The one or more sixth data structures may correspond to one or more low-rank matrices. The one or more low-rank matrices may be associated with at least one or more of, but not limited to, the one or more employees, the one or more electronic messages, and the one or more time instances.

At step 408, the priority of the one or more first electronic messages is determined. In an embodiment, the processor 202 may determine the priority of the one or more first electronic messages based on at least one or more parts of the one or more sixth data structures. The one or more sixth data structures may be associated with at least one or more of, but not limited to, the one or more employees, the one or more electronic messages, and the one or more time instances. Thereafter, the processor 202 may utilize the low-rank matrices associated with the one or more employees and the one or more electronic messages to determine a joint prioritization matrix. In an embodiment, the processor 202 may perform a mathematical operation such as multiplication of the low-rank matrices associated with the one or more employees and the one or more electronic messages to determine the joint prioritization matrix. Further, the processor 202 may sort each row of the joint prioritization matrix to determine the priority of the one or more first electronic messages.

At step 410, the one or more first electronic messages are transmitted to the one or more employees. In an embodiment, the processor 202 may transmit the one or more first electronic messages to the one or more employees based on the determined priority.

Figure 5:
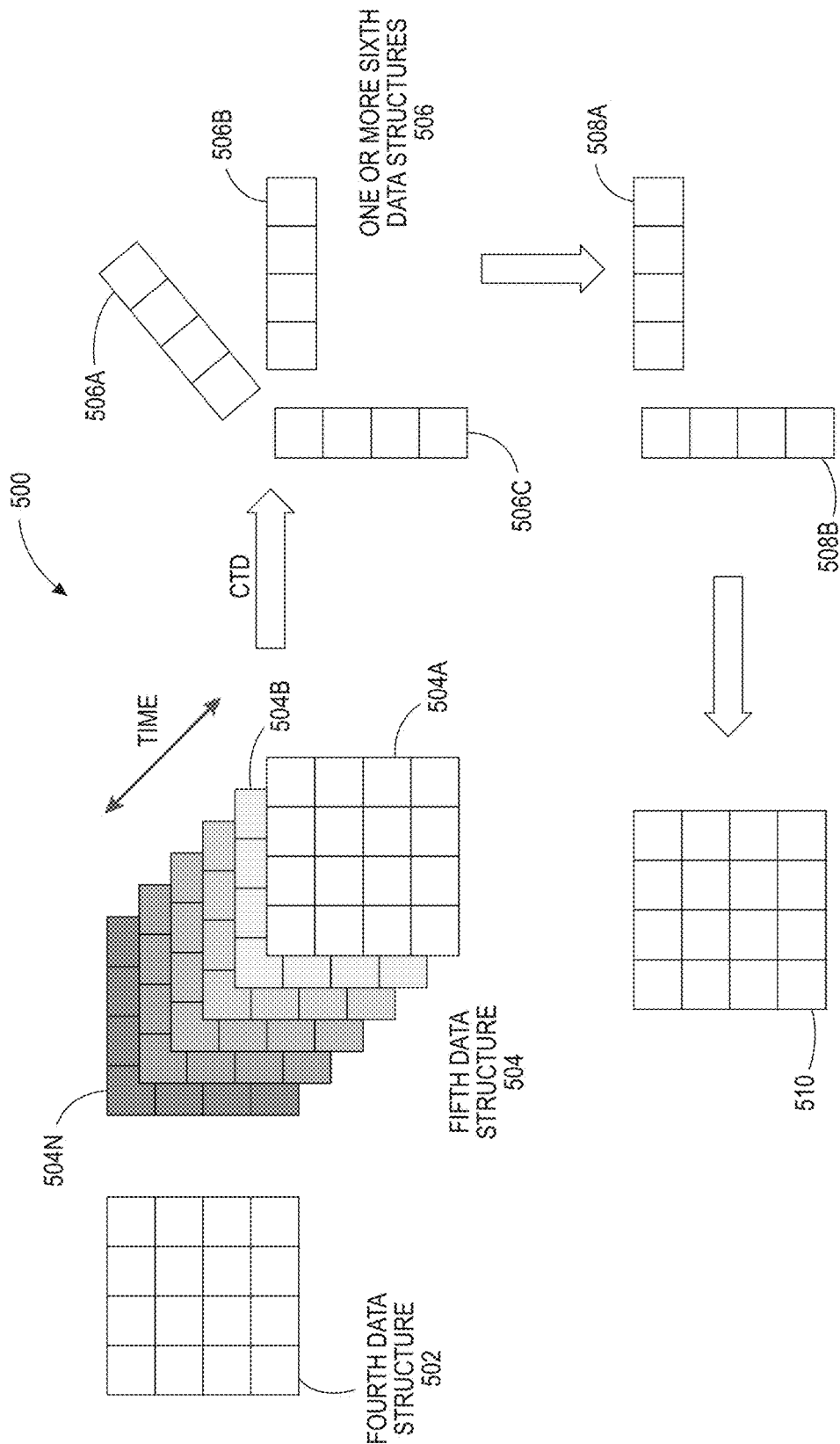
FIG. 5 is a block diagram illustrating a determination of a joint prioritization data structure, when preferences of one or more employees changes with time, in accordance with at least one embodiment.

FIG. 5 is a block diagram 500 displaying an illustrative example of determination of the joint prioritization data structure, when preferences of the one or more employees changes with time, in accordance with at least one embodiment. The processor 202 may generate the fourth data structure (depicted by 502) and the one or more updated fifth data structures for each of the one or more time instances (depicted by 504A, 504B, . . . . , 504N). The one or more updated fifth data structures (depicted by 504A, 504B, . . . . , 504N) may be generated by utilizing the CMF technique as discussed above with reference to FIG. 3. Thereafter, the processor 202 may transform the fourth data structure (depicted by 402) and the one or more updated fifth data structures (depicted by 504A, 504B, . . . . , 504N) to generate the one or more sixth data structures (depicted by 506A, 506, and 506C). The processor 202 may utilize the CTD technique to obtain the one or more sixth data structures (depicted by 506A, 506, and 506C). The one or more sixth data structures (depicted by 506A, 506, and 506C) may correspond to the low-rank matrices. The one or more sixth data structures may be associated with at least one or more of, but not limited to, the one or more employees, the one or more electronic messages, and the one or more time instances. The processor 202 may multiply the low-rank matrices (depicted by 508A and 508B) associated with the one or more employees and the one or more electronic messages to obtain the joint prioritization matrix (depicted by 510). Thereafter, the processor 202 may sort each row of the joint prioritization matrix independently to obtain the ranking of the one or more first electronic messages for which the one or more employees may be eligible to receive.

Figure 6:
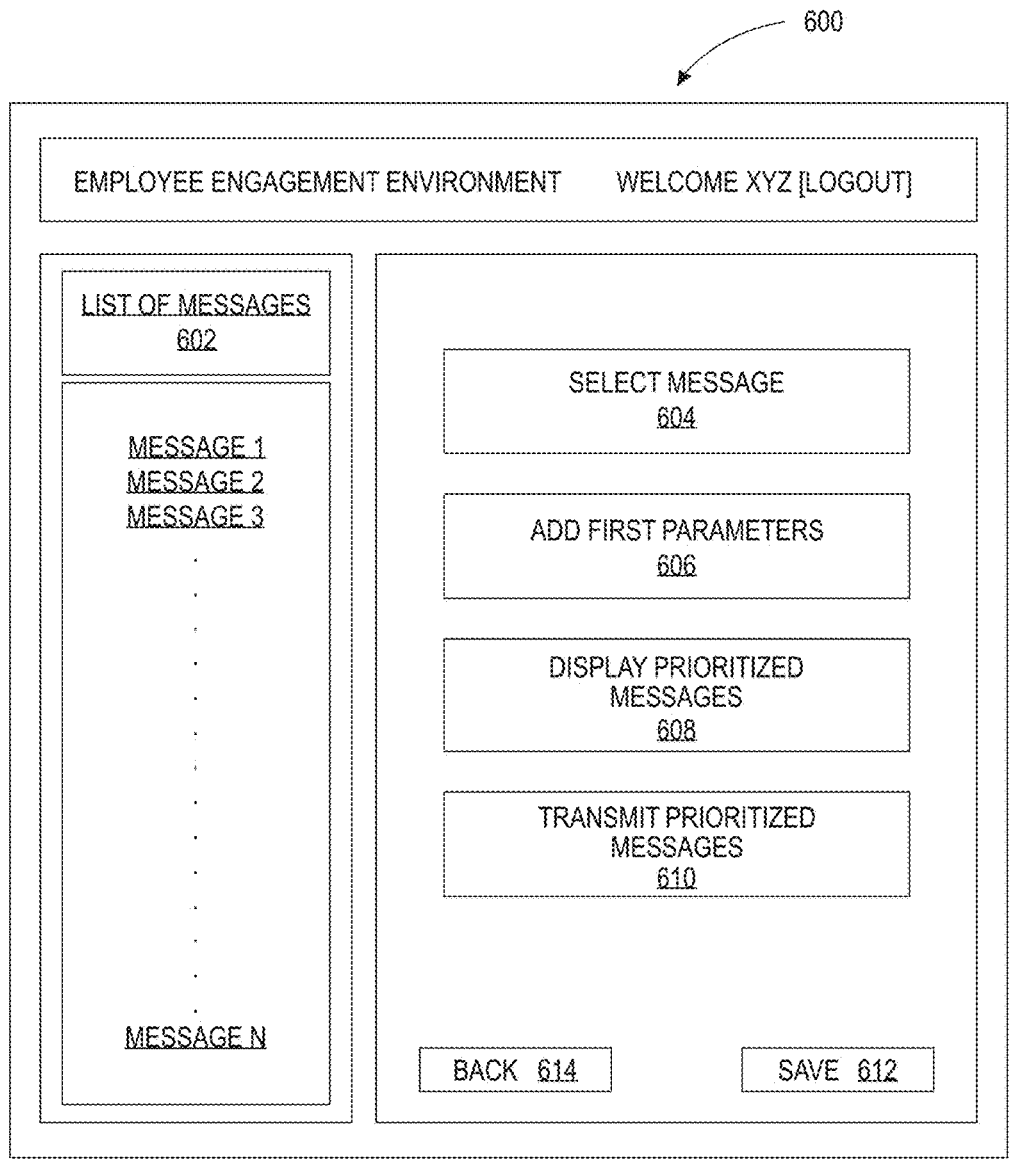
FIG. 6 is an example graphical user interface (GUI) that may be presented to an employer on a display screen of a computing device to provide one or more input pertaining to a transmission of a first electronic message to one or more employees, in accordance with at least one embodiment.
Figure 7:
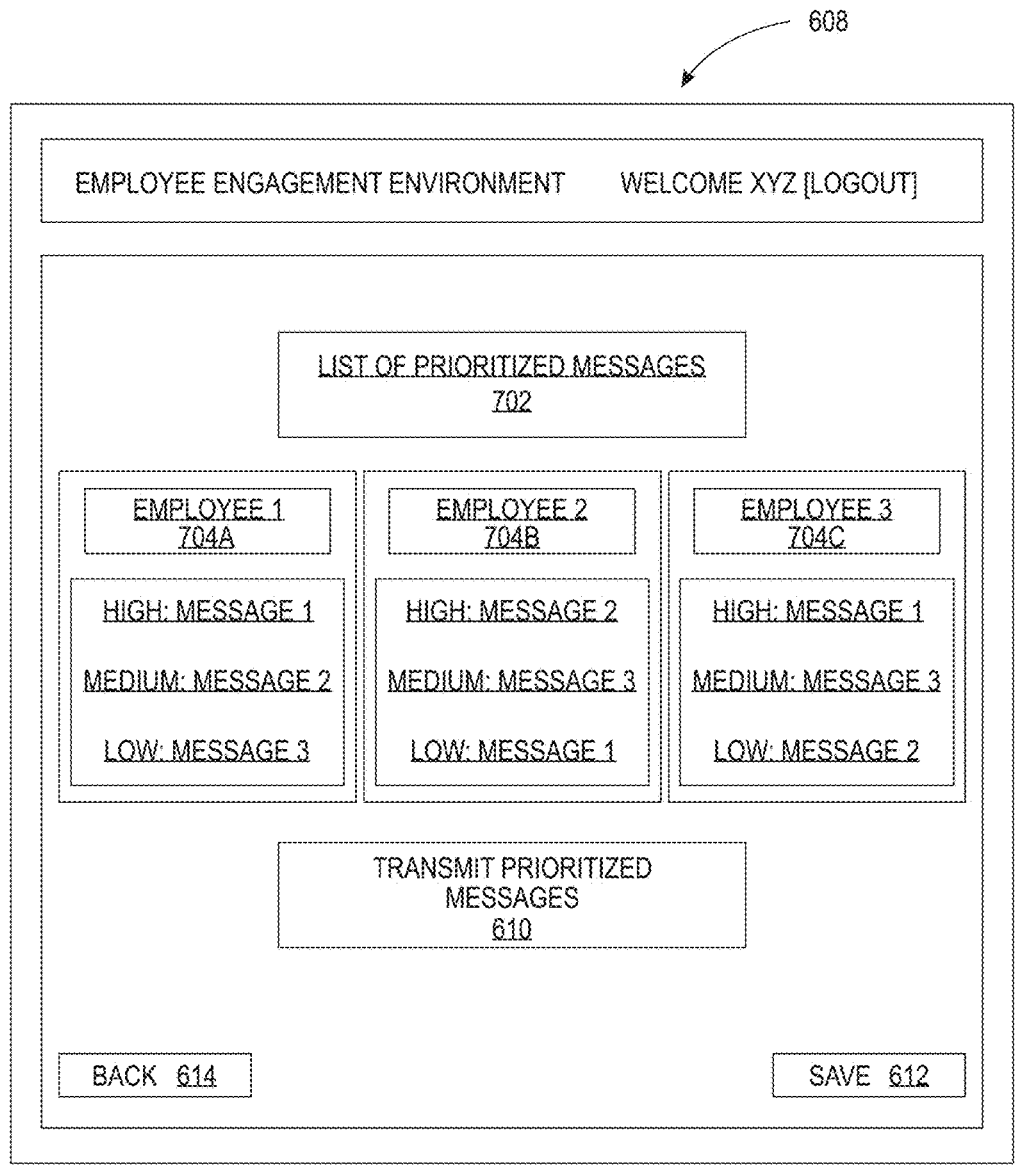
FIG. 7 is an example graphical user interface (GUI) that may be presented to an employer on a display screen of a computing device displaying prioritization of one or more first electronic messages, in accordance with at least one embodiment.

FIG. 6 is an example graphical user interface (GUI) that may be presented to the employer on the display screen of the computing device to provide one or more input pertaining to a transmission of the one or more first electronic messages to the one or more employees, in accordance with at least one embodiment. The GUI 600 may be displayed on the display screen of the computing device such as the employer computing device 102. The employer or the subject matter expert may log into an employer engagement environment system using his/her user id and password. The processor 202 may present the GUI 600 to the employer or the subject matter expert, when the employer or the subject matter expert has logged in. The employer or the subject matter expert may utilize the GUI 600 to select the one or more first electronic messages, input the one or more first parameters, view the prioritized one or more first electronic messages and transmit the prioritized one or more first electronic messages. For example, the employer may click on a select message tab 604 to view and select the one or more first electronic messages (depicted by 602). Further, the employer may click on the one or more first electronic messages (depicted by 602) to select the one or more first electronic messages. Thereafter, the employer may click on an add first parameters tab 606 to input the one or more first parameters corresponding to the selected one or more first electronic messages. Further, the employer may click on a display prioritized messages tab 608 to view the prioritization of the one or more first electronic messages. For example, FIG. 7 is the example GUI 608 that may be presented to the employer on the display screen of the employer computing device 102, when the employer may have clicked on the display prioritized messages tab 608. The GUI 608 may display the prioritization of the one or more first electronic messages for each of the one or more employees (depicted by 704A, 704B, and 704C). The employer may click on a back tab 614 to go back to a previous GUI such as the GUI 600. Thereafter, the employer may click on a transmit prioritized messages tab 710 to transmit the prioritized one or more first electronic messages to the one or more employees (depicted by 704A, 704B, and 704C). In an embodiment, the employer may click on a save tab 612 to save any of the changes that he/she may have made on the GUI 600 or the GUI 608.

Various embodiments of the disclosure lead to a method and a system for transmitting the prioritized one or more first electronic messages to the one or more employees. The method utilizes preferences of the employer and the one or more employees to determine the priority of the one or more first electronic messages. The preferences of the employer may comprise the one or more first parameters depicting the one or more features/factors associated with the one or more first electronic messages and the one or more historical electronic messages. The preferences of the one or more employees are determined based on the log of one or more actions comprising at least the one or more feedbacks or the one or more ratings provided by the one or more employees pertaining to the one or more historical electronic messages. The disclosed method further utilizes the one or more demographic attributes of the one or more employees to determine the priority of the one or more first electronic messages. The disclosed method further transmits the one or more first electronic messages to the one or more employees based on the determined priority. The transmission of the prioritized one or more first electronic messages may lead to a better health, wealth, and career outcomes for the one or more employees. Further, the disclosed method promotes increased employee education, participation and accountability by providing more relevant and timely information. The disclosed method further adapts to changes in personal/demographic preferences over time. The disclosed method can be further utilized to infer initial preferences of the new employees.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to "C," "C++," "Visual C++," and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for transmitting the prioritized one or more electronic messages (new messages) to the one or more employees have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for transmitting a first electronic message to an employee, said method comprising:
   determining, by one or more processors, one or more first parameters of one or more electronic messages comprising said first electronic message from an employer, wherein said first parameters correspond to a pre-defined preference of said employer;
   determining, by said one or more processors, one or more demographic attributes associated with said employee and one or more second parameters, the one or more second parameters representative of one or more feedbacks provided by said employee on each of said one or more electronic messages other than said first electronic message;
   generating, by said one or more processors, a first data structure based on said one or more first parameters, said one or more second parameters, and said one or more demographic attributes;
   determining, by said one or more processors, a priority of said first electronic message for said employee based on a part of one or more second data structures extracted from said first data structure and a predicted parameter of said one or more second parameters, wherein said one or more second data structures correspond to similar message preferences between said employer and said employee, said similar message preferences are determined based on said one or more first parameters and said one or more second parameters; and transmitting, by said one or more processors, said first electronic message to said employee based on said determined priority of said first electronic message.

2. The method of claim 1, wherein said one or more electronic messages corresponds to at least one or more of an instant message conversation, an electronic mail, a voice mail, a text message, and a message corresponding to a query/problem.

3. The method of claim 1, wherein said one or more first parameters comprise at least one or more of a risk, an initiative, a campaign, and one or more domains associated with each of said one or more electronic messages.

4. The method of claim 3, wherein said one or more domains comprise at least one or more of a health domain, a career domain, and a wealth domain.

5. The method of claim 1, wherein said one or more demographic attributes associated with said employee comprise at least one or more of a gender, an age group, a relationship code, a department code, an employee status, and a base salary.

6. The method of claim 1, wherein said one or more feedbacks provided by said employee on each of said one or more electronic messages comprise at least a rating assigned, an action taken, or a text input corresponding to each of said one or more electronic messages.

7. The method of claim 1, wherein said first data structure is generated based on at least a transformation of said one or more first parameters, said one or more second parameters, and said one or more demographic attributes.

8. The method of claim 1 further comprising generating, by said one or more processors, a third data structure, a fourth data structure, and a fifth data structure, wherein said third data structure is generated based on said part of said one or more second data structures, said fourth data structure is generated based on said one or more first parameters, and said fifth data structure is generated based on said one or more second parameters.

9. The method of claim 8, wherein said predicted parameter is based on at least a comparison of said fifth data structure with said third data structure.

10. The method of claim 9 further comprising updating, by said one or more processors, said fifth data structure using said predicted parameter, wherein said fifth data structure is updated at each of one or more time instances.

11. The method of claim 10 further comprising generating, by said one or more processors, one or more sixth data structures based on said fourth data structure and said updated fifth data structure at each of said one or more time instances using a canonical tensor decomposition technique.

12. The method of claim 11 further comprising determining said priority of said first electronic message for said employee based on a part of said one or more sixth data structures.

13. A system for transmitting a first electronic message to an employee, said system comprising:
one or more processors configured to:
determine one or more first parameters of one or more electronic messages comprising said first electronic message from an employer, wherein said first parameters correspond to a predefined preference of said employer;
determine one or more demographic attributes associated with said employee and one or more second parameters, the one or more second parameter representative of one or more feedbacks provided by said employee on each of said one or more electronic messages other than said first electronic message;
generate a first data structure based on said one or more first parameters, said one or more second parameters, and said one or more demographic attributes;
determine a priority of said first electronic message for said employee based on a part of one or more second data structures extracted from said first data structure and a predicted parameter of said one or more second parameters, wherein said one or more second data structures correspond to similar message preferences between said employer and said employee, said similar message preferences are determined based on said one or more first parameters and said one or more second parameters;
transmit said first electronic message to said employee based on said determined priority of said first electronic message.

14. The system of claim 13, wherein said one or more processors are further configured to generate said first data structure based on at least a transformation of said one or more first parameters, said one or more second parameters, and said one or more demographic attributes, wherein said transformation is based on one or more techniques comprising at least one of a Collective Matrix Factorization (CMF) technique, a Collaborative Filtering (CA) technique, and a Canonical Tensor Decomposition (CTD) technique.

15. The system of claim 14, wherein said one or more processors are further configured to determine a third data structure, a fourth data structure, and a fifth data structure, wherein said third data structure is generated based on said part of said one or more second data structures, said fourth data structure is generated based on said one or more first parameters, and said fifth data structure is generated based on said one or more second parameters.

16. The system of claim 15, wherein said one or more processors are further configured to predict said one or more second parameters of said employee based on at least a comparison of said fifth data structure with said third data structure.

17. The system of claim 16, wherein said one or more processors are further configured to update said fifth data structure using said predicted parameter, wherein said fifth data structure is updated at each of one or more time instances.

18. The system of claim 17, wherein said one or more processors are further configured to generate one or more sixth data structures based on said fourth data structure and said updated fifth data structure at each of said one or more time instances using a canonical tensor decomposition technique.

19. The system of claim 18, wherein said one or more processors are further configured to determine said priority of said first electronic message for said employee based on a part of said one or more sixth data structures.

20. A computer program product for use with a computer, the computer program product comprising a non-transitory computer readable medium, wherein the non-transitory computer readable medium stores a computer program code for transmitting a first electronic message to an employee, wherein the computer program code is executable by one or more processors to:
determine one or more first parameters of one or more electronic messages comprising said first electronic message from an employer, wherein said first parameters correspond to a predefined preference of said employer;
determine one or more demographic attributes associated with said employee and one or more second parameters, the one or more second parameter representative of one or more feedbacks provided by said employee on each of said one or more electronic messages other than said first electronic message;
generate a first data structure based on said one or more first parameters, said one or more second parameters, and said one or more demographic attributes;
determine a priority of said first electronic message for said employee based on a part of one or more second data structures extracted from said first data structure and a predicted parameter of said one or more second parameters, wherein said one or more second data structures correspond to similar message preferences between said employer and said employee, said similar message preferences are determined based on said one or more first parameters and said one or more second parameters; and
transmit said first electronic message to said employee based on said determined priority of said first electronic message.

* * * * *